Patented Oct. 7, 1952

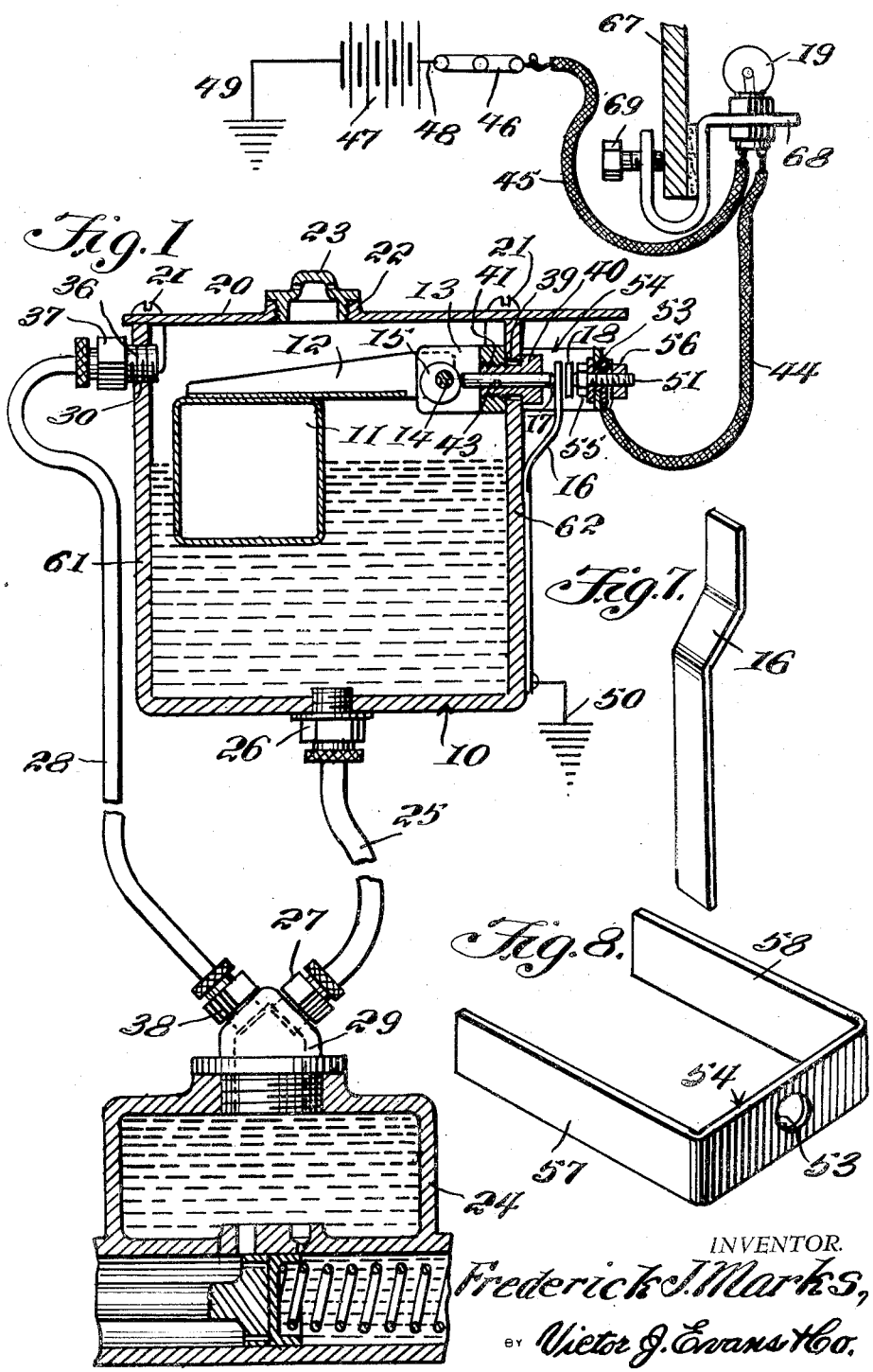

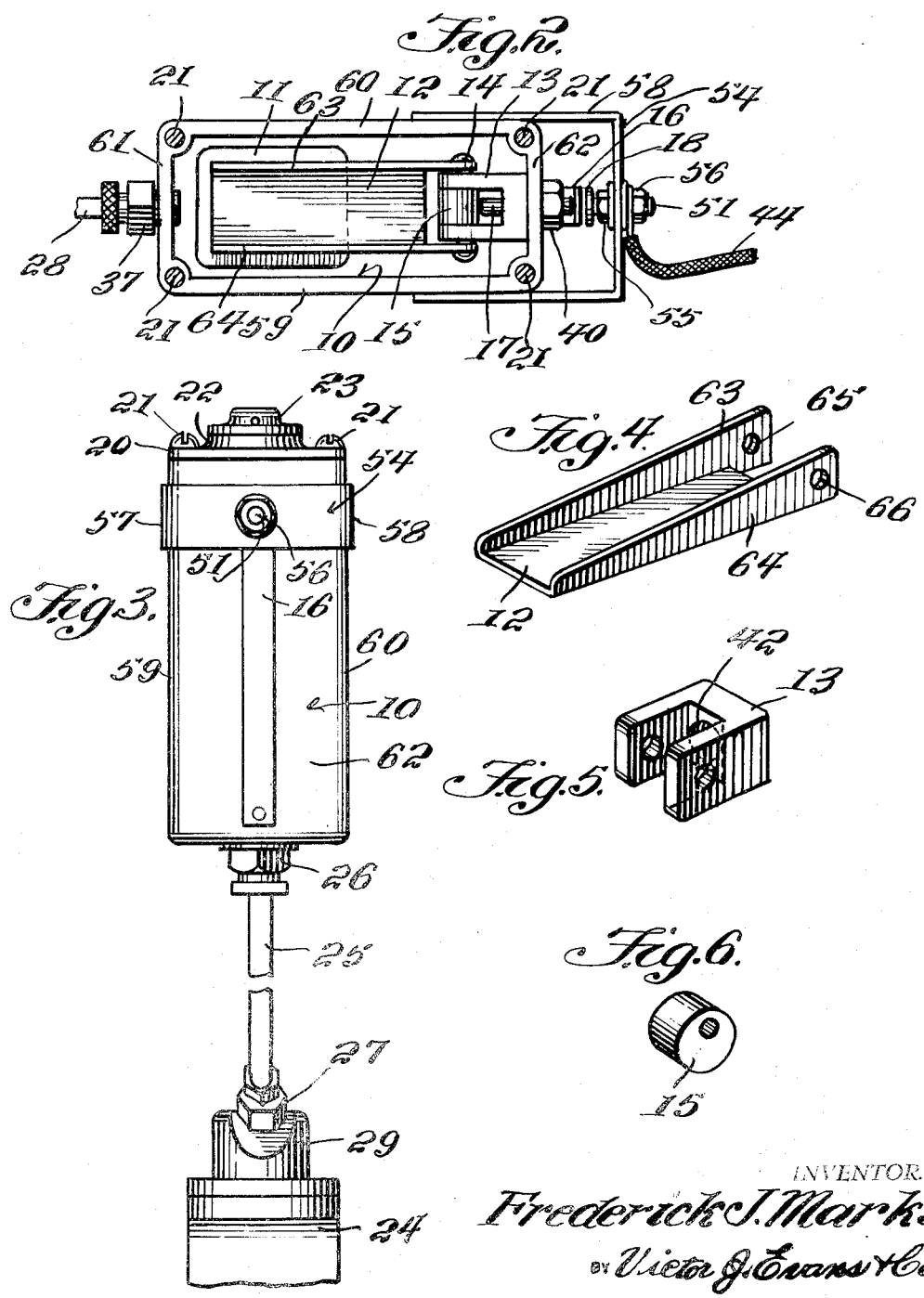

2,613,293

UNITED STATES PATENT OFFICE 2,613,293

HYDRAULIC BRAKE FLUID WARNING DEVICE

Frederick J. Marks, Barnsboro, N. J.

Application June 29, 1950, Serial No. 171,025

1 Claim. (Cl. 200—84)

This invention relates to warning, signal, and alarm devices particularly used in combination with motor vehicles, and in particular this invention relates to means for warning the operator of a motor vehicle when the brake fluid in a reservoir for feeding the fluid to the master brake cylinder is exhausted.

The purpose of this invention is to prevent failures of brake systems on motor vehicles due to the exhaustion of brake fluid in the system, particularly resulting from leakage.

Brake systems of motor vehicles are provided with numerous connections and although various types of packing glands and sealing washers are used in the connections leaks develop and accidents result from exhaustion of the brake fluid. With this thought in mind this invention contemplates means for warning the operator of a motor vehicle when the brake fluid of the brake system is dangerously low.

The object of this invention is, therefore, to provide means for constructing a float actuated indicating device whereby the warning light is provided when brake fluid in a hydraulic brake system reaches a dangerously low point.

Another object of the invention is to provide a brake fluid warning signal that may be incorporated in motor vehicles now in use.

A further object of the invention is to provide a brake fluid warning signal device for motor vehicles which is of a simple and economical construction.

With these and other objects and advantages in view the invention embodies a hydraulic brake system having a master cylinder with a supply reservoir and with a float in the supply reservoir mounted to close a contact to complete a circuit to a warning light positioned adjacent the instrument board of the vehicle when the fluid in the reservoir reaches a predetermined level.

Other features and advantages of the invention will appear from the following description taken in connection with the drawings wherein:

Figure 1 is a fragmentary view showing sections through the master cylinder and brake fluid reservoir with connecting tubes and wires and with parts broken away.

Figure 2 is a plan view of the brake fluid reservoir with the cover plate removed.

Figure 3 is an end elevational view showing the brake fluid reservoir and master cylinder with the parts connected by a tube and with the tube broken away.

Figure 4 is a detail illustrating a channel shape prong on which the float may be carried.

Figure 5 is a detail illustrating a mounting socket of the float arm in the brake fluid reservoir.

Figure 6 is a detail illustrating the cam actuated by the float for closing contacts to complete a circuit to a warning light.

Figure 7 is a detail illustrating a spring contact positioned on the end of the brake fluid reservoir chamber.

Figure 8 is a detail illustrating a mounting bracket for suspending a contact in a position spaced from the end wall of the brake fluid reservoir chamber.

Referring now to the drawings wherein like reference characters denote corresponding parts the brake fluid warning device of this invention includes a brake fluid reservoir 10, a float 11 which is carried on the outer end of an arm 12 that is pivotally mounted on a socket 13 by a pin 14, a cam 15 and a spring 16 positioned to be actuated by a pin 17 to engage a contact 18 to complete a circuit to a warning light 19.

The brake fluid reservoir 10 is formed with a rectangular shaped casing having a cover plate 20 secured to the upper end by screws 21 and the cover plate is provided with an internally threaded boss 22 in which a filling plug 23 is threaded.

The reservoir 10 is connected to a master cylinder 24 by a tube 25 having coupling members 26 and 27 at the ends, and as illustrated in Figure 1 a vent is provided through a tube 28 that extends from the plug 29 of the master cylinder 24 to an opening 30 in the upper end of the reservoir 10 and the tube 28 is provided with suitable plugs or connectors 37 and 38. The master cylinder 24 is connected in the brake system of the motor vehicle by conventional means.

One of the end walls of the reservoir 10 is provided with an opening 39 in which a plug 40 is positioned and the plug is provided with a threaded shank 41 that is threaded into a threaded opening 42 in the base of the socket 13, as shown in Figure 1.

The plug 40 is provided with a longitudinally disposed opening 43 in which the pin 17 is positioned and the inner end of the pin is positioned to contact the outer surface of the cam 15 with the cam mounted on the pin 14. As the float 11 moves downwardly with the level of the liquid in the reservoir 10 the cam 15 forces the pin 17 outwardly forcing the spring contact 16 against the contact 18 thereby completing a circuit from a wire 44 to one terminal of the light 19 with the circuit extended from the opposite terminal of the light through a wire 45 to an ignition switch 46 from which it is connected to a battery 47 by a wire 48 and the battery is provided with a ground connection 49. The spring contact 16 is also provided with a ground connection 50.

The contact 18 forms the head of a screw 51 and the screw is secured in an insulated bushing 52 and an opening 53 of an end wall 54 of a bracket, by nuts 55 and 56, as shown in Figure 1. The end of the wire 44 is clamped under the nut 56.

The bracket in which the contact is carried is provided with arms 57 and 58 that are positioned against the side walls 59 and 60 of the brake fluid reservoir 10. The reservoir is provided with end walls 61 and 62, the connector 37 being positioned in the end wall 61 and the plug 40 with the socket 13 thereon being positioned in the opening in the end wall 62.

The arm 12 on which the float 11 is carried is channel shaped in cross section, having flanges 63 and 64 at the sides and openings 65 and 66 in the ends thereof which are positioned over the ends of the pin 14, as shown in Figure 2.

The warning light 19 is attached to an instrument board 67 by a bracket 68 with a thumb screw 69 for clamping the bracket in position.

With the parts arranged in this manner the float 11 moves downwardly as the level of the brake fluid in the reservoir 10 lowers whereby the cam 15 turns around forcing the pin 17 through the plug whereby the spring 16 is forced against the contact 18 thereby completing a circuit through the warning light 19. As fluid is restored in the reservoir 10 the float returns to the position shown in Figure 1 wherein the contact is broken in the circuit to the warning light 19.

It will be understood that modifications may be made in the design and arrangement of the parts without departing from the spirit of the invention.

What is claimed is:

In a hydraulic brake system, a reservoir, a plug extended through a wall of the reservoir, a socket positioned on the inner end of the plug, a float carrying arm pivotally mounted on the socket, a pin extended through the plug and socket, a cam positioned in the socket and mounted to be actuated by the float carrying arm to move a contact through the pin outwardly, a spring contact positioned to engage the outer end of the pin actuated by the cam, a stationary contact, a bracket extended from the chamber in which the stationary contact is mounted, and said bracket positioning the stationary contacts to be engaged by the spring contacts.

FREDERICK J. MARKS.

REFERENCES CITED

The following references are of record in the file of this patent:

UNITED STATES PATENTS

| Number | Name | Date |
| --- | --- | --- |
| 555,120 | Porath | Feb. 25, 1896 |
| 1,115,712 | Miller | Nov. 3, 1914 |
| 1,885,051 | Smulski | Oct. 25, 1932 |
| 2,085,173 | Stansbury | June 29, 1937 |
| 2,253,260 | Alcorn | Aug. 19, 1941 |
| 2,479,503 | Moore | Aug. 16, 1949 |
| 2,494,802 | Fox | Jan. 17, 1950 |
| 2,520,237 | Cleary | Aug. 29, 1950 |